July 24, 1956  W. P. OEHLER ET AL  2,755,613
DISK HARROW
Filed Aug. 5, 1954  2 Sheets-Sheet 1
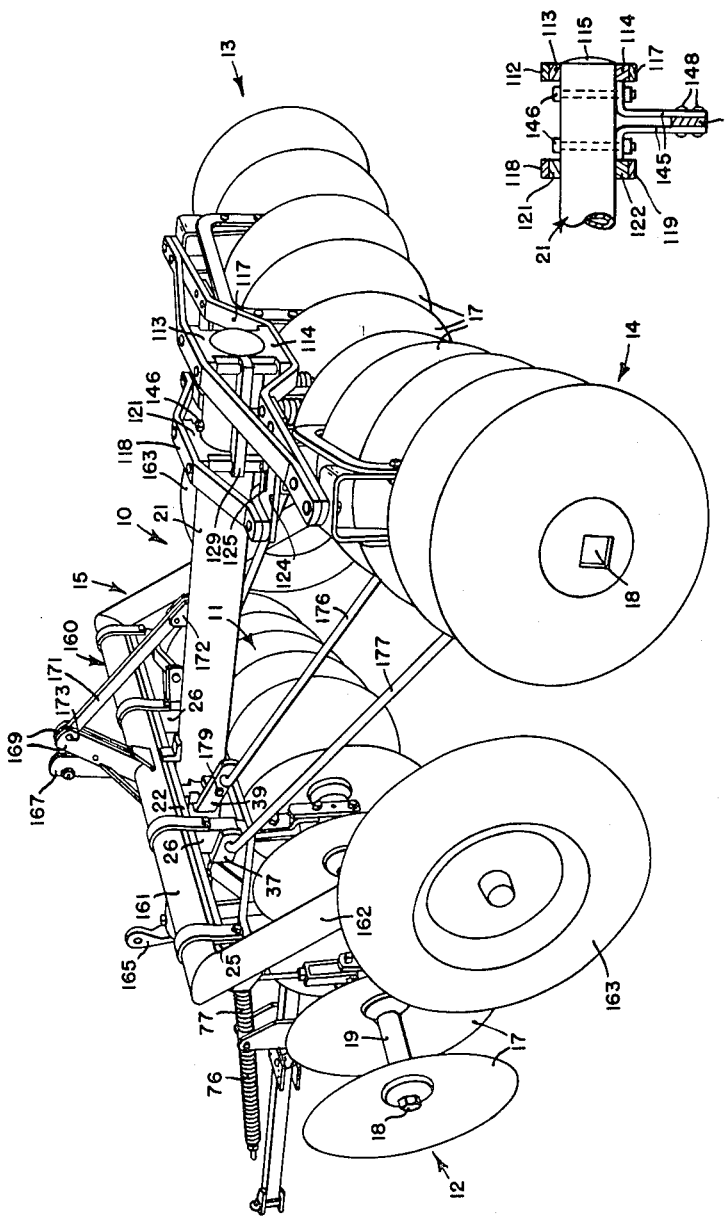
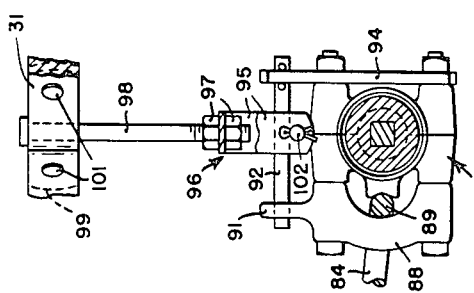
INVENTORS.
WILLIAM P. OEHLER
LESLIE W. JOHNSON
BY
ATTORNEYS July 24, 1956

W. P. OEHLER ET AL 2,755,613

DISK HARROW

Filed Aug. 5, 1954

INVENTORS.
WILLIAM P. OEHLER
LESLIE W. JOHNSON
BY

ATTORNEYS

United States Patent Office 2,755,613
Patented July 24, 1956

2,755,613

DISK HARROW

William P. Oehler and Leslie W. Johnson, Moline, Ill., assignors to Deere & Company, Moline, Ill., a corporation of Illinois Application August 5, 1954, Serial No. 448,008

15 Claims. (Cl. 55—83)

The present invention relates generally to agricultural implements and more particularly to disk harrows and similar ground-working machines.

The object and general nature of the present invention is the provision of a relatively heavy double action tandem disk harrow especially adapted for use in those sections of the country where the ground is prepared without plowing. For example, this is the practice in certain territories where rice is grown, the disk harrow being used several times over the field in different directions before flooding and seeding. In the rice territories low ridges in the form of borders, terraces, and the like are frequently encountered, and therefore it is a further feature of this invention to provide a relatively heavy deep working disk harrow with sufficient rigidity to withstand the forces encountered in normal operations of this kind but with sufficient flexibility to pass over ridges, terraces, and the like, from any and all directions with a minimum loss of working depth in so doing.

More specifically, it is a feature of this invention to provide a disk harrow of the type having a rigid main frame, including a transverse forward portion and a generally fore-and-aft extending rear portion, the two rear gangs being rigidly connected to a rear frame structure that pivots on the rearwardly extending main frame portion, with the front gangs individually pivoted at their inner ends to the transverse forward portion of the main frame. It is an additional feature of this invention to provide a pivoted drawbar connection, with spring cushioned mechanism whereby in following the tractor over ridges, terraces, and the like, the several working disk gangs penetrate the ground uniformly and thoroughly while accommodating the uneven ground surface.

These and other features and advantages of the present invention will be apparent to those skilled in the art after a consideration of the following detailed description, taken in conjunction with the accompanying drawings in which:

Fig. 1 is a perspective view of a disk harrow in which the principles of the present invention have been incorporated, the view being taken mainly from the side of the harrow and slightly to the rear thereof.

Fig. 4 is a fragmentary side view of the transport support means for the outer ends of the front gangs.

Fig. 5 is a detail view of the rocking connection between the rear gang cross frame and the rear end of the main frame.

Figure 2:
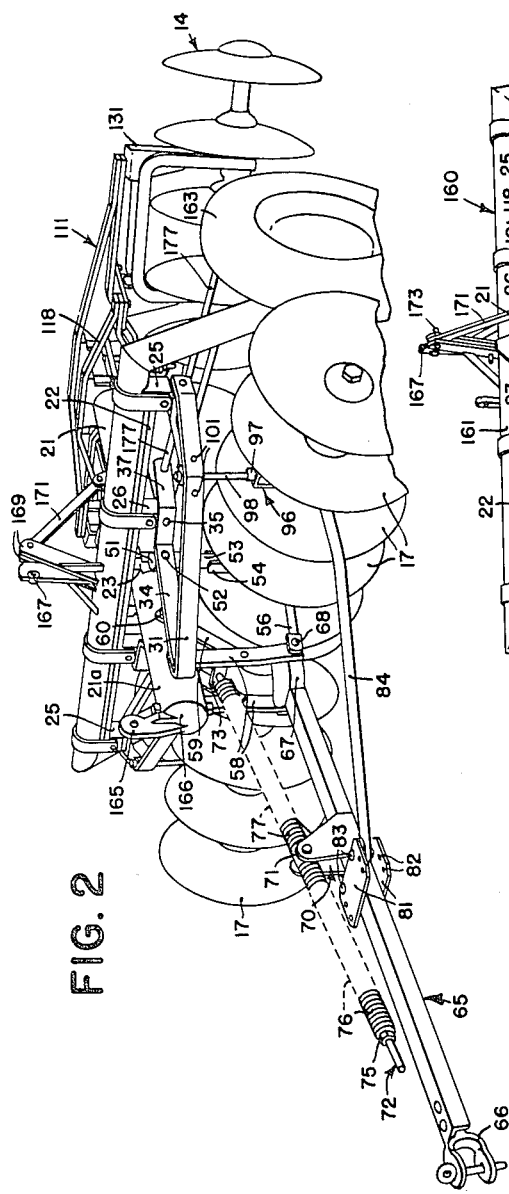
Fig. 2 is a perspective view taken principally from the front of the harrow.

Referring first to Fig. 1, the disk harrow in which the principles of the present invention have been incorporated comprises a main frame 10, a pair of right- and left-hand front gangs 11 and 12, and a pair of right- and left-hand rear gangs 13 and 14. The harrow is supported in transport by means of a wheel carrier frame 15. Each of the gangs 11—14 is of substantially the same or similar construction, each including a plurality of ground-working disks 17 mounted on a gang bolt 18 and separated by spacing spools 19, this being generally conventional construction.

The main frame 10 includes a generally fore-and-aft extending rigid pipe member 21 the front portion of which is rigidly connected to a transverse member 22, the latter being disposed generally at right angles to the pipe member 21 and rearwardly of the front end thereof, as best shown in Fig. 2. The transverse member 22 comprises a double channel bar securely fixed, as by bolts, to a pair of brackets 23, one secured to each side of the pipe member 21 by a pair of bolts that extend through both brackets 23 and the pipe member 21. Each outer end of the bar 22 is bolted to an end block or outer bracket 25 and also to similar laterally inner blocks or brackets 26. A reinforcing bar 31 is disposed generally diagonally between the forward end portion 21a (Fig. 2) of the main frame or pipe member 21 and each laterally outer end of the transverse frame bar 22. Preferably, the rear laterally outer end of each of the frame bars 31 is connected by bolted clips 33 to the adjacent laterally outer bracket 25, and the forward and laterally inner end portion of the brace bar 31 is turned rearwardly, as best shown in Fig. 2, and secured to the forward end portion 21a of the pipe member by the same bolt that connects the forward end of the laterally inner frame bar 34 to the pipe member 21. A rear portion of the bar 34 is connected to the associated bracket 26 by a bolt 35. The rear portion of the frame bar 34 passes under the bar 22 and is provided with a laterally outwardly and rearwardly offset portion 37 disposed laterally outwardly of the adjacent laterally inner bracket 26. This portion 37 of the bar 34 is apertured, for a purpose that will be explained later. Laterally inwardly of each of the brackets 26, there is a similar bar 39 that is connected to the frame bracket 23 at its forward portion, this bracket or bar 39 also being apertured for a purpose that will be explained later. The transverse bar 22, together with the bracing or reinforcing bars 31 and 34, forms a part of the structure upon which the wheel carrier frame 15 is pivoted. The transverse frame is completed by a lower crossbar 41 that extends transversely underneath the pipe member 21 and is connected at its ends to the laterally outer frame brackets 25 at the intermediate portions of the bar 41. Where the latter passes underneath the laterally inner frame bracket 26, the bar 41 is fastened to the latter brackets through spacers 43. The central portion of the lower transverse bar 41 is apertured and secured, as by a bolt or the like, to the lower part of the pipe member 21.

Each of the front gangs 17 is swingably connected with the main frame 10 of the harrow for generally vertical movement at the outer ends of the gangs. They are also connected at the inner ends with the main frame of the harrow for limited fore-and-aft movement at their outer ends, and the means by which these permissive motions are secured will now be described. A socket 51 is bolted, as at 52, to each of the reenforcing frame bars 34 and rotatably receives the upper end of a front gang pivot standard 53, to the lower end of which a pair of bearing yoke brackets 54 are bolted at their upper ends. The lower ends of the yoke brackets 54 connect to the laterally inner bearing structure of the disk gang, 11 or 12. Also connected to each of the bearing structures is a forwardly extending, draft-transmitting link 56, and the front end of each of the links 56 is connected to a vertical hitch bracket 58. The upper end of each of the brackets 58 is bolted or otherwise connected to the front end portion 21a of the pipe member 21, and the hitch brackets 58 are reenforced by diagonally extending braces 59, the upper ends of which are connected, as at 60, with the pipe member 21. Thus, the laterally inner ends of the front gangs are mounted for rotation but held against displacement in a generally fore-and-aft direction. Each disk gang may pivot upwardly or downwardly at its laterally outer end relative to the yoke brackets 53.

Also connected to the lower ends of the two hitch brackets 58 is a vertically swingable drawbar 65 carrying at its forward end a clevis 66 by which the implement may be readily connected to a farm tractor or the like. The rear end of the drawbar 65, which is of channel section, is fixed to a yoke casting 67 hingedly mounted on a cross shaft 68, the outer ends of which receive the draft links 56. Thus, the drawbar 65 may swing generally vertically relative to the disk harrow frame 10, as is required when, for example, the tractor passes over a ridge down one side thereof while the implement is still moving up on the other side, yet in operation on generally level ground, the implement is maintained in proper operating position, with the front gangs working in the ground to about the same depth as the rear gangs, by means of long cushion springs that serve yieldably to hold the implement and drawbar against vertical swinging one relative to the other when operating over level ground but which, at the same time, permits the necessary drawbar movement when passing over uneven ground. As best shown in Fig. 2, a bracket 70 is fixed to the drawbar in upwardly extending position and a trunnion 71 is rockably mounted between the two portions forming the bracket 70. Axially movable through the trunnion 71 is an elongated rod 72 the rear end of which is threaded into a trunnion bar 73, the latter having a tapped opening adapted to receive the rear threaded end of the bar 72. The trunnion bar 73 is rockably mounted in the diagonal brace bars 59. The forward end of the rod 72 is also threaded and receives an adjusting nut 75, and between the latter and the trunnion 71 an elongated cushioning spring 76 is disposed. A similar elongated cushioning spring 77 is disposed between the trunnion 71 and the rear portion of the rod 72, the spring 77 bearing at its rear end against a stop collar or the equivalent fixed to the rear end of the rod 72. Thus, by turning the rod 72 in one direction or the other relative to the rear trunnion bar 73, the rear spring 77 is adjusted, and by changing the position of the forward nut 75, the tension exerted by the front spring 76 is adjusted. These adjustments are made to provide level and uniform operation when traversing substantially level ground, yet the yielding of the springs 76 and 77 provides adequate flexibility to permit the harrow to be drawn over ridges and the like in substantially any direction for adequately working the ground substantially to a uniform depth during such passage.

Generally midway of its length, the drawbar 65 carries a pair of upper and lower draft link adjustment plates 81, each end of each plate having a plurality of holes 82 therein to receive pins 83 by which the laterally outwardly and rearwardly extending draft links 84 are connected with the drawbar 65.

As best shown in Fig. 4, the rear end of the draft link 84 at each side of the harrow is connected to the associated laterally outer front bearing structure, indicated in Fig. 4 by the reference numeral 86, by any suitable means, such as a draft bracket 88 bolted to the bearing 86 and having a central portion receiving the hook end 89 at the rear of the draft link 84.

A lug 91 extends upwardly from the draft bracket 88 and is provided with a square aperture receiving a square bar 92, the rear end of which is carried in a vertical bracket bar 94, also bolted to the bearing 86, and a horizontal square bar 92 passes between the lower sides 95 of a yoke 96 that is connected by a pair of adjusting nuts 97 to the lower end of a gang-supporting rod 98, the lower end of which is threaded to receive the adjusting nuts 97 and the upper end of which passes through a clip 99 that is fastened, as at 101, to the associated brace bar 31. A pin 102 extends through openings in the lower end of the yoke sides 95 and passes underneath the bar 92. A supporting structure of this kind is provided for the outer end of each of the front gangs 11 and 12 and acts to support the outer ends of the front gangs when the disk harrow frame 10 is raised into a transport position.

The rear gangs 13 and 14 are connected rigidly to a rigid transversely extending frame member 111 that is mounted for rocking movement on the rear end of the pipe member 21. The transverse swingably mounted frame member 111 comprises four transverse strap-like bars, two at the front and two at the rear. The upper rear bar is indicated at 112 and extends from one side of the machine to the other being apertured at its central portion where the bar passes over an upper rear bearing member 113. The rear bearing is completed by a lower bearing member 114, disposed about the rear end of the pipe member 21 just forward of a cap member 115 that closes the rear end of the pipe 21. Each of the bearing members 113 and 114 is apertured to receive a pair of vertical bolts, which also extend through the apertured generally central portion of a lower frame bar 117 that also extends from one side to the other of the machine and, like the ends of the upper bar 112, the ends of the lower bar 117 are apertured to receive connecting bolts or the like. The front bars 118 and 119 are similar to the rear bars 112 and 117 but are shorter. The front bars 118 and 119 are apertured to receive vertical bolts that fasten the front bars 118 and 119 to upper and lower front bearing members 121 and 122, which may be identical with the rear bearing members 113 and 114. The laterally outer ends of the front bars 118 and 119 are fixed to two rear gang adjustment plates 124, which plates are slotted, as at 125, the adjustment plates 124 also being secured to the adjacent portion of the lower rear transverse frame bar 117, as by bolts 127. The plates 124 thus serve to tie the front and rear sets of transverse bars together, these bars also being tied together by short fore-and-aft extending bars 129 the ends of which receive the bolts that connect the front and rear bearings to the transverse bars 112, 117, and 118, 119.

Figure 3:
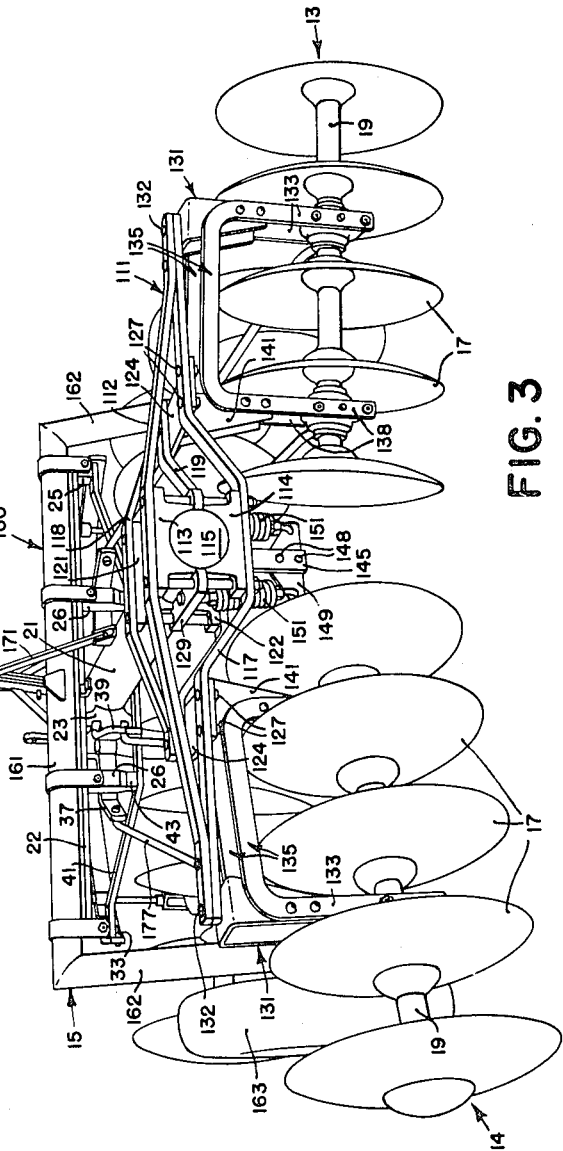
Fig. 3 is a perspective view of the rear portion of the harrow.

Connected to the outer ends of the rear transverse bars 112 and 117 are swiveled yokes 131. The upper or bight portion of each yoke 131 is pivoted on the laterally outer bolt 132 that connects the rear bars 112 and 117. Each yoke 131 has side members that extend generally downwardly, and in the present instance the sides of each outer yoke 131 receive the upper portion of the downwardly extending legs 133 of a pair of front and rear gang frame members 135. As best shown in Fig. 3, these members are generally U-shaped strap-like parts having a plurality of openings therein. The lower ends of the laterally outer sections 133, and the similar laterally inner sections 138, are bolted to the laterally inner and outer bearing structures of the associated rear gang. Also secured to the laterally inner side section 138 is a laterally inner yoke member 141, which may be constructed like the outer yoke members 131, the yoke members 141 being secured in any suitable way to the adjusting plates 24. Preferably, the laterally inner yoke members 141 are secured to the adjustment plates 124 by means of a bolt or the like that is shiftably mounted in the associated slots 125. Thus, while each rear gang may be adjusted to different positions of angle, the rear gangs are rigidly connected to the transverse frame bar 111, which latter bar is swingably mounted on the rear end of the pipe member 21 for movement relative thereto about a fore-and-aft extending axis. Such movement is, however, yieldingly resisted by spring means that will now be described. A pair of depending bracket bars 145 have their upper ends turned laterally and bolted, as at 146 (Fig. 5), to the lower side of the pipe member 21, the upper end of the depending brackets 145 fitting snugly between the front and rear lower bearing members 114, 122. The lower end of the bracket bars 145 are connected, as at 148, to a transverse bar 149 to the laterally outer end of which a pair of springs 151 are connected. The upper ends of the springs 151 are adjustably connected to the bars 129. Thus, with their lower ends connected to the main frame carried bracket 145 and with their upper ends connected with the transverse rockable frame member 111, it will be seen that the tension exerted by the springs 151 will tend to hold the transverse frame 111 level or in horizontal position when the outfit is in transport but will yield to permit the rear disk gang to take different angular positions relative to the implement about the shaft or pipe member 121 as a center.

The wheel carrier unit 15 forms means that, when operated, serves to raise and lower the main frame of the harrow into and out of operating position. The wheel frame carrier comprises a frame 160 that includes an upper horizontal pipe member 161 and a pair of depending pipe members 162 connected, as by welding, at their upper ends to the laterally outer end of the pipe member 161. Axles (not shown) are welded to the lower end of the pipe section 162 and receive the ground wheels 163. The wheels 163 are located generally between the outer portions of the front and rear disk gangs, as will be clear from Fig. 1. The wheel carrier is swung from one position to another by any suitable power unit, such as the conventional hydraulic power cylinder connected between a front bracket 165 mounted on a cap 166 that closes the front end of the pipe member 21, as best shown in Fig. 2, and a vertically extending arm 167. The latter part is swingable between a pair of strap members 169 that are rigidly fixed, as by welding, to the central section of the pipe 161, as best shown in Fig. 1. The arm members 169 may be connected by a lock-up strap 171 with a bracket 172 mounted on the frame member 21 whenever it is desired to lock the carrier frame in a transport position, as shown in Fig. 1, a quick detachable pin 173 being provided for quickly connecting the link 171 with the arms 169. The latter are brought to the proper position for connecting the link 171 by extending to the full extent of its movement the associated hydraulic cylinder that is normally connected with the arms 165 and 167.

Mention above was made of the fact that the operating angle of the front gangs may be varied by removing the pins 83 and shifting the draft links 84 to a new position, as permitted by the additional openings 82 in the plates 81. In the case of the rear gangs, their operating angle may also be changed by adjusting the inner of two links 176 and 177 that connect the inner and outer gang bearings with the front frame structure. As will be seen in Fig. 1, the inner link 176 may be connected to any one of a number of openings 179 formed in the brace bar extension 39. The upper end of the non-adjustable link 177 is connected to an extension 37 formed on the brace bar 34. In making this adjustment it will, of course, be necessary to loosen the connection between the inner gang yokes 141 and the associated gang-adjusting plates 124.

The operation of the implement described above is substantially as follows. After connecting the swivel 66 to the tractor drawbar and connecting the operating hydraulic cylinder of the tractor between the arms 165 and 167 the outfit is ready for operation, after first extending the hydraulic cylinder the maximum amount and then releasing the lock-up link 171 from the arms 169. When the outfit is driven over terraces, ridges and the like, the front gangs may flex to accommodate the uneven ground by virtue of the permissive movement of either end of either front gang relative to the laterally inner end, and as the tractor and harrow pass over uneven ground, the disks are kept operating at substantially uniform depth by virtue of the permissive vertical swinging of the drawbar 65 relative to both the tractor and the implement.

During the forward travel of the implement, the rear gangs accommodate the uneven ground by virtue of the permissive swinging of the transverse rigid frame bar 111 relative to the rear end of the frame bar 21.

When it is desired to raise the harrow into a transport position, all that it is necessary to do is to extend the hydraulic cylinder carried by the arms 165 and 167 which serves to swing the wheels 163 downwardly and thus lift the harrow relative to the wheels 163. The harrow may be placed in operation by retracting the hydraulic cylinder and thus raising the wheels 163. The wheels 163 may also be used as depth-gauging means since they may be lowered until they run along the ground.

While we have shown and described above the preferred structure in which the principles of the present invention have been incorporated, it is to be understood that our invention is not to be limited to the exact details shown and described above, but that, in fact, widely different means may be employed in the practice of the broader aspects of our invention.

What we claim, therefore, and desire to secure by Letters Patent is:

1. A disk harrow comprising a main frame including a generally fore-and-aft extending member and a transversely extending frame member rigidly connected to the forward portion of said fore-and-aft extending member, a transverse rear gang frame member swingably connected at its generally central portion with the rear end of said fore-and-aft extending member for generally vertical swinging relative thereto, a pair of rear gangs, each connected at its ends to said transverse frame member so as to swing therewith relative to said main frame, spring means connected to act between said fore-and-aft extending frame member and said gang frame member to resist said swinging, a pair of front gangs, means swingably connecting the inner ends of the forward gangs with the transversely extending main frame member, lost-motion means connecting the outer ends of said front gangs with the laterally outer end portions of said transversely extending frame member.

2. A disk harrow comprising a rigid generally fore-and-aft extending main frame member, a transverse frame bar pivotally connected at its intermediate portion to the rear portion of the main frame for movement relative thereto about a generally fore-and-aft extending axis, a pair of rear disk gangs fixedly connected to said transverse frame bar, one at each side of said axis, a transverse bar fixed to the forward portion of said main frame member, a pair of front gangs, means swingably connecting the laterally inner portion of each front gang to said fixed transverse frame bar for generally vertical swinging of the front gangs relative to said front bar, a drawbar pivotally connected at its rear end with the forward end of said main frame member, and means limiting the vertical movement of the outer ends of the front gangs relative to the laterally outer end portions of said transverse frame bar.

3. A disk harrow comprising a rigid generally fore-and-aft extending main frame member, a transverse frame bar pivotally connected at its intermediate portion with the rear portion of said main frame member, a depending bracket fixed to the rear portion of said fore-and-aft extending main frame member, spring-cushioning means acting between the lower end of said bracket and said transverse frame bar, disk gangs rigidly carried by said transverse frame bar, and front gangs flexibly connected with the front portion of said rigid main frame member.

4. A disk harrow comprising a rigid generally fore-and-aft extending main frame member and a transverse frame member rigidly connected to the forward portion of said generally fore-and-aft extending frame member, a rear transverse frame bar pivotally connected at its intermediate portion to the rear portion of said fore-and-aft extending main frame member, a pair of front gangs flexibly connected with the transverse rigid frame member, a pair of rear gangs rigidly connected with said rear transverse frame bar, and spring means acting between the rear portion of said fore-and-aft extending frame member and said transverse frame bar for yieldably resisting pivotal movement of the latter relative to said fore-and-aft extending main frame member.

5. The invention set forth in claim 4, further characterized by a pair of rear gang adjusting plates fixed to said rear transverse frame bar, and means adjustably connecting the inner ends of the rear disk gangs to said adjusting plates.

6. A disk harrow comprising a rigid main frame including a fore-and-aft extending pipe member and a transverse frame member rigidly connected to the forward portion of said pipe member, a pair of front gangs flexibly connected with said transverse frame member, a rear transverse frame bar pivotally mounted on the rear end of said pipe member, said rear transverse frame bar comprising upper and lower bearing means encircling the rear portion of said pipe member, and upper and lower frame bars fixed to said bearing members and to one another, and a pair of rear gangs connected rigidly with said rear transverse frame bar.

7. The invention set forth in claim 6, further characterized by said rear transverse frame bar including a pair of rear bearing members connected with the upper and lower transverse bars, a second pair of upper and lower bearing members connected with the first-mentioned bearing members in fore-and-aft spaced relation, a pair of upper and lower transverse bars connected with said second pair of bearing members, and a pair of gang-adjusting plates connected between said front transverse bars and one of said rear transverse bars, the inner end of each rear gang being connected with the associated gang-adjusting plate.

8. The invention set forth in claim 7, further characterized by a pair of fore-and-aft extending bars interconnecting the front and rear bearing members, a depending bracket fixed to said pipe member and located between the lower front and rear bearing members, and cushioning springs acting between the lower portion of said depending bracket and said fore-and-aft extending bars, said spring means yieldably resisting rocking movement of said transverse bar and the rear gangs connected therewith.

9. A disk harrow comprising a main frame including a fore-and-aft extending member and a transversely extending member, said members, being rigidly interconnected, and the fore-and-aft extending member extending forwardly of said transverse member, a pair of front gangs connected with said transversely extending member, a pair of rear gangs connected with the rear portion of said fore-and-aft extending member, a pair of generally diagonally outwardly and rearwardly extending brace bars connected at their forward portions to the forward portions of the fore-and-aft extending frame member and at their rear portions to the laterally outer portions of said transverse frame member, and a draft-transmitting link member connected to the rear outer portion of each of said diagonal members and to the laterally outer portion of the associated rear gang.

10. A disk harrow comprising a generally fore-and-aft extending frame member, a transversely disposed frame member swivelly connected with the rear portion of said fore-and-aft extending frame member and swingable about the axis of the latter, a pair of disk gangs, pivot means connecting the laterally outer portion of each disk gang to the associated end of said transverse frame member, adjustable means fixedly connecting the laterally inner end of each of said disk gangs to the laterally inner portions of said transverse frame member, whereby said gangs swing with said transverse frame member about the longitudinal axis of said fore-and-aft extending member, means serving as a pair of brackets fixed to each side of said fore-and-aft extending frame member, and a pair of draft-transmitting links connecting the laterally inner and outer portions of each disk gang to the associated bracket means.

11. The invention set forth in claim 10, further characterized by said bracket means having provision to receive the associated draft-transmitting link in different positions, whereby to adjust the angle of the associated disk gang relative to said transverse frame member.

12. A disk harrow comprising a main frame member extending in a generally fore-and-aft direction, a pair of front gangs connected with the front portion of said main frame member, a pair of rear gangs connected with the rear portion of said main frame member, a pair of depending draft brackets fixed to the forward portion of said main frame member and including a pair of upwardly and rearwardly angled brace members, a trunnion rod rockably received by said brace members, a drawbar pivotally connected for vertical swinging movement to the lower end of said draft brackets, a stabilizing rod threaded into said trunnion member, a bracket fixed to said drawbar, a trunnion carried by said drawbar and slidably receiving said stabilizing rod, a pair of elongated compression springs disposed on said rod and arranged at opposite sides of said second trunnion, and adjusting means carried by said rod and acting against the ends of said springs opposite said second trunnion member.

13. A disk harrow comprising a rigid main frame including a fore-and-aft extending member and a transversely extending member rigidly fixed to said fore-and-aft extending member adjacent the forward end portion thereof, a transverse frame member pivotally connected to the rear end of said fore-and-aft extending frame member and swingable about the longitudinal axis of the latter member, a pair of rear gangs connected with said last mentioned transverse member, a pair of front gangs shiftably connected with said first mentioned transverse frame member, and a wheel carrier rockably mounted on said first mentioned transverse frame member and including wheel-carrying arms extending into the space between said front and rear gangs, and ground-engaging wheels journaled on said arms.

14. A disk harrow comprising a rigid generally fore-and-aft extending main frame member, a transverse frame member swingably connected at an intermediate portion to the rear portion of the main frame member for movement relative thereto about a generally fore-and-aft extending axis coinciding with the longitudinal axis of said main frame member, and a pair of rear disk gangs connected with said transverse frame member and adjustable thereto about generally vertical axes.

15. The invention set forth in claim 14, further characterized by link-receiving means fixed to the forward portion of said main frame member spaced thereon forwardly of said transverse frame member, and link means extending from one end of each disk gang generally forwardly and swingably connected with said fixed link-receiving means.

References Cited in the file of this patent

UNITED STATES PATENTS 2,239,948   Young   Apr. 29, 1941
2,402,884   Gier   June 25, 1946

OTHER REFERENCES

Farm Implement News, vol. 71, No. 1., of Jan. 10, 1950. Smalley Ram Disk Advertisement on page 97. Copy available in Patent Office library.